No. 870,022. PATENTED NOV. 5, 1907.
A. DYER.
LINE FASTENER.
APPLICATION FILED MAR. 7, 1907.
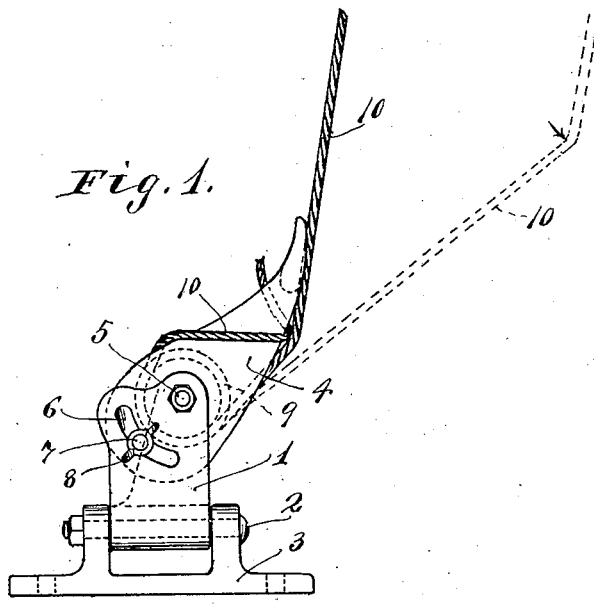
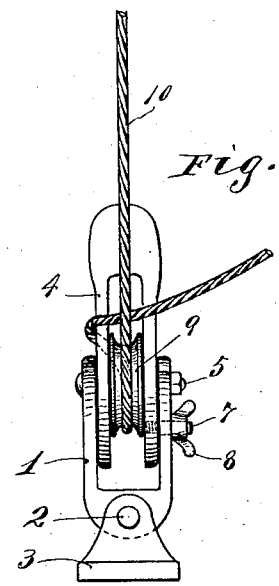
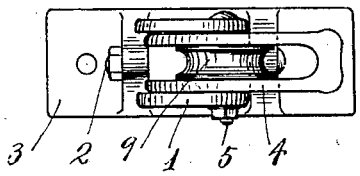
Witnesses.
A. H. Opsahl.
L. L. Simpson.
Inventor.
Arthur Dyer.
By his Attorneys.
Williamson Merchant
THE NORRIS PETERS CO., WASHINGTON, D. C.

UNITED STATES PATENT OFFICE.

ARTHUR DYER, OF DEEPHAVEN, MINNESOTA.

LINE-FASTENER.

No. 870,022.　　　Specification of Letters Patent.　　　Patented Nov. 5, 1907.

Application filed March 7, 1907. Serial No. 361,152.

*To all whom it may concern:*

Be it known that I, ARTHUR DYER, a citizen of the United States, residing at Deephaven, in the county of Hennepin and State of Minnesota, have invented certain new and useful Improvements in Line-Fasteners; and I do hereby declare the following to be a full, clear, and exact description of the invention, such as will enable others skilled in the art to which it appertains to make and use the same.

Broadly, my invention relates to line fasteners, but has for its especial object to provide an adjustable line fastener particularly adapted for use in connection with sailboats to hold the main sheet or back stay.

To the above ends the invention consists of the novel devices and combinations of devices hereinafter described and defined in the claims.

In the accompanying drawings which illustrate the invention, like characters indicate like parts throughout the several views.

Referring to the drawings, Figures 1, 2 and 3 are views, respectively, in side elevation, front elevation and plan, showing the improved device.

Of the parts of the device, the numeral 1 indicates an approximately U-shaped block which is pivotally connected by a bolt 2 to prongs of an anchor bracket 3, which latter is adapted to be secured by screws or bolts to the deck or other suitable part of the boat, or any other suitable support. The numeral 4 indicates a bifurcated arm which works between and is pivotally connected to the up-turned sides of the block 1, preferably by a short nutted bolt 5. In one of the sides of the block 1 is a segmental slot 6 in which works a stud 7 secured to the adjacent side of the arm 4. On the threaded outer end of the stud 7 is a nut 8, preferably in the form of a thumb nut, which, when tightened, securely clamps the side of the arm 4 against the adjacent side of the block and thereby securely holds the said arm in any angular position in which it may be set with respect to the said block.

The arm 4 is provided with a hub, preferably in the form of a loose sheave 9 that is pivotally mounted on the bolt 5 and is located between the sides of the said arm. The projecting free end of the arm 4 is preferably slightly curved, as best shown in Fig. 1.

The numeral 10 indicates a rope or line which is passed down over the curved end of the arm 4, thence partly around the hub or sheave 9, thence outward over one side of the said arm 4 and between the extended portion of the rope 10 and the sides of the said arm. When a rope is thus attached, the tension on the upwardly extended portion of the rope tightly presses the engaged portion of the said rope against and slightly between the bifurcated sides of the arm 4, thus producing a kink therein and serving to hold said line with a frictional engagement which will increase under increasing tension on the line.

The arm 4 is capable of adjustment on its pivot bolt 5, so that it may be set at the proper angle to cause the extended portion of the line to bear properly against the outer end of the said arm. By pivotal adjustments on the bolt 2, the arm 4 and block 1 will adapt themselves to the position of the line in a direction transversely of the said arm. It is evident that the line may be easily released simply by pulling the extended portion of the line 10 away from the extended end of the arm 4, so as to thereby relieve the held portion of the line from the tension of the outer or extended portion of the line. For instance, if the extended portion of the line be thrown into the position indicated by dotted lines in Fig. 1, it is evident that the line will be released from the line fastener.

What I claim is:

1. A line fastener comprising a support and a bifurcated arm pivotally connected thereto and provided with a hub portion between its sides over which and the extended end of said arm the line to be held is adapted to be passed, substantially as described.

2. In a line fastener, the combination with an anchoring bracket, of a bearing block pivotally connected thereto, and an arm adjustably pivoted to said block for movement transversely of the pivotal movement of said block, said arm having a hub portion over which and the extended end of said arm the line to be fastened is adapted to be passed, substantially as described.

3. In a line fastener, the combination with an anchoring bracket, of an approximately U-shaped bearing block pivotally connected thereto, a bifurcated arm pivotally attached to said U-shaped bearing block, said arm having a hub portion between its sides, and means for securing said arm in different adjustments, with respect to said bearing block, substantially as described.

4. In a line fastener, the combination with an anchoring bracket 3, of an approximately U-shaped bearing block 1 pivotally connected to said bracket, a bifurcated arm 4 working between and pivotally connected to the laterally spaced sides of said block 1, a sheave mounted between the laterally spaced sides of said arm, and a stud carried by said arm and working through a slot in the adjacent side of said block 1, and provided at its outer end with a nut whereby said arm 4 may be secured in different adjustments in respect to said block 1, substantially as described.

5. In a line fastener, the combination with an approximately U-shaped bearing block, of a bifurcated arm pivotally connected thereto and provided with a hub portion between its laterally spaced sides, and means for rigidly securing said arm in different angular adjustments in respect to said bearing block, substantially as described.

6. A line fastener comprising a bifurcated arm having a hub portion located between its laterally spaced sides and over which hub and the extended end of which arm a line is adapted to be passed and fastened, substantially as described.

In testimony whereof I affix my signature in presence of two witnesses.

ARTHUR DYER.

Witnesses:
　MALIE HOEL,
　F. D. MERCHANT.